(No Model.)

W. P. BONHAM.
WHEEL REPAIRING DEVICE.

No. 597,455. Patented Jan. 18, 1898.

Witnesses
Arthur Browning.
C. H. McEwen.

Inventor
William P. Bonham
By W. W. Dudley & Co.
his Attorneys.

UNITED STATES PATENT OFFICE.

WILLIAM P. BONHAM, OF MARION, VIRGINIA, ASSIGNOR TO S. R. BONHAM AND O. C. SPRINKLE, OF SAME PLACE.

WHEEL-REPAIRING DEVICE.

SPECIFICATION forming part of Letters Patent No. 597,455, dated January 18, 1898.

Application filed February 19, 1897. Serial No. 624,119. (No model.)

*To all whom it may concern:*

Be it known that I, WILLIAM P. BONHAM, a citizen of the United States, residing at Marion, in the county of Smyth and State of Virginia, have invented certain new and useful Improvements in Wheel-Repairing Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to vehicle-wheels and is directed to improvements in devices for effecting the repairing of wheels the spokes of which have become broken or otherwise rendered unfit for use, said devices being capable of employment in the restoration of an old spoke or spokes, as well as in the replacement of new spokes when required.

The nature of my invention is fully disclosed in the following detailed description, which is to be read in connection with the accompanying drawings, illustrating my invention, in which—

Figure 1:
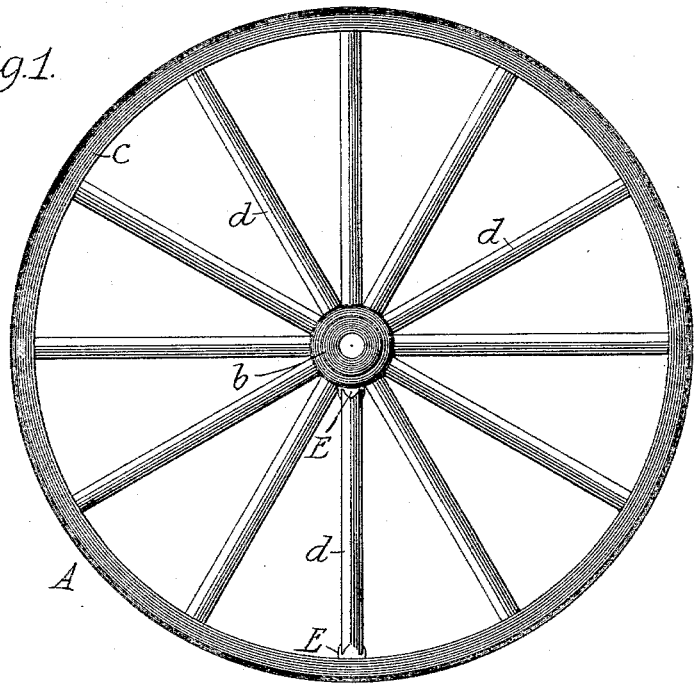
Figure 2:
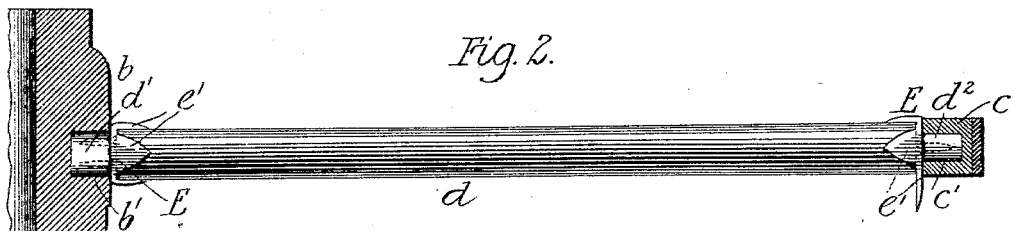
Figure 3:
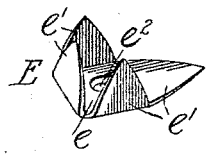
Figure 4:
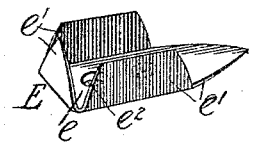

Figure 1 is an elevation of a vehicle-wheel with my invention embodied therein. Fig. 2 is an enlarged sectional view of a portion of the wheel, showing my improved device in place at both ends of a spoke. Fig. 3 is a perspective view of the improved device which is adapted for application to the rim end of a spoke, and Fig. 4 is a perspective view of the device adapted for the hub end of a spoke.

Referring to the said drawings by letter, A denotes a wooden wheel, constructed, as usual, with the hub $b$, rim $c$, and spokes $d$ $d$, which latter are provided with end tenons $d'$ $d^2$ for insertion in the respective sockets $b'$ and $c'$, formed in the hub and rim.

In the breakage of a wheel the fracture is mostly found at the tenon or tenons, this point being the weakest, and the result of the breakage is that most, if not all, of the tenon is left within the socket and but little remains with the spoke. If the spoke is otherwise sound, the same can by my invention be restored to its original degree of utility and strength; but if the spoke is beyond repair a new spoke may be inserted without in any way disturbing the other portions or members of the wheel.

The device for effecting the repairs to the wheel is shown at E, and consists of a metallic plate $e$, provided with a plurality of upturned lips $e'$ $e'$, the body of the plate in practice being interposed between the spoke end and rim or hub, as the case may be, and the spoke end being socketed in said lips. The plate for economy of construction is preferably originally of rectangular form, and the lips $e'$ are formed by bending the corners thereof, as will be understood. In the body of the plate is a perforation or perforations $e^2$ for a screw, nail, or other securing device.

In practice, supposing the broken tenon to be within the socket, any projections are cut away, in order that the inner surface of the rim and the exposed end of the tenon may be flush. The plate is then placed in position over the tenon with the lips projecting toward the hub, and a screw or similar device is then passed through the projection into the tenon to hold the plate firmly to place. As shown in Figs. 3 and 4, the devices are formed normally with but three upturned lips $e'$, the fourth corner of the plate being in line with the body and providing an opening through which the spoke end may be laterally inserted, after which said corner is bent to form the fourth lip and the spoke end is inclosed. Before the insertion of the said end any projections left by the fracture are removed, and when in place in the device the spoke is held by the wedging action of the plate-body, as well as from lateral movement by the lips. If the opposite end of the spoke is sound, the plate can be secured to place by springing the spoke at its fractured end outward temporarily and permitting it to resume its position after the plate is in position. The lips are reduced in thickness toward the edge, as shown, to make a neater finish. The device illustrated in Fig. 3 is intended for use at the rim end of the spoke, while Fig. 4 shows the device for use at the hub end, this latter construction differing from the former only in the general form and the employment of a number of perforations for the screws or other securing means. The method and means employed in the insertion of new spokes are exactly similar to the method and means for repairing old and fractured spokes, the only additional step being in the removal of the new spoke-tenons. In some cases where the fracture occurs at both tenons a short tenon may be formed at one end—as, for instance, the rim end—and fitted within a shallow socket and one of the devices employed for the other end in the manner before described.

By my invention any person not skilled in the art may repair a wheel, as it is unnecessary that the latter be taken apart and refitted. Moreover, the operation of making repairs is attended with the minimum of time and expense. A wheel repaired in accordance with my invention is strong and durable and its appearance is unimpaired.

I claim as my invention—

1. A vehicle-wheel-repairing device consisting of a perforated plate adapted to be interposed between a spoke end and the wheel rim or its hub, and to be secured to the latter by a screw or the like passed through the perforation and into the inner side of the rim or hub, and provided at its edge with a plurality of upturned lips to engage and partially embrace the spoke end, and with a lip normally in line with the plate-body but adapted to be upturned against said spoke end upon the insertion of the latter to complete the embracement, substantially as described.

2. A vehicle-wheel-repairing device consisting of a rectangular plate adapted to be interposed between a spoke end and the wheel rim or its hub and provided with means for securing the same to said rim or hub, and provided at its edge with a plurality of upturned lips to engage and partially embrace the spoke end, and with a lip normally in line with the plate-body but adapted to be upturned against said spoke end upon the insertion of the latter to complete the embracement, substantially as described.

In testimony whereof I affix my signature in presence of two witnesses.

WILLIAM P. BONHAM.

Witnesses:
C. H. CARPER,
H. N. BELL.